(12) United States Patent
Sandhu et al.

(10) Patent No.: US 8,019,881 B2
(45) Date of Patent: *Sep. 13, 2011

(54) SECURE COOKIES

(75) Inventors: Ravi Sandhu, San Antonio, TX (US);
Joon S. Park, Springfield, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 11/864,597

(22) Filed: Sep. 28, 2007

(65) Prior Publication Data

US 2008/0052775 A1 Feb. 28, 2008

Related U.S. Application Data

(63) Continuation of application No. 11/303,927, filed on Dec. 19, 2005, now Pat. No. 7,293,098, which is a continuation-in-part of application No. 09/451,090, filed on Nov. 30, 1999, now Pat. No. 6,985,953.

(60) Provisional application No. 60/110,217, filed on Nov. 30, 1998.

(51) Int. Cl.
*G06F 15/16* (2006.01)
*G06F 11/00* (2006.01)

(52) U.S. Cl. ........ 709/229; 709/203; 709/226; 709/228; 707/10

(58) Field of Classification Search .................. 709/203, 709/224, 226, 228, 229; 707/10; 345/329
See application file for complete search history.

(56) References Cited

U.S. PATENT DOCUMENTS

| | | | | |
|---|---|---|---|---|
| 5,774,670 A | * | 6/1998 | Montulli | 709/227 |
| 5,826,242 A | * | 10/1998 | Montulli | 705/26.8 |
| 6,134,592 A | * | 10/2000 | Montulli | 709/229 |
| 7,302,402 B2 | * | 11/2007 | Callaghan et al. | 705/26.8 |

* cited by examiner

*Primary Examiner* — Khanh Q Dinh
(74) *Attorney, Agent, or Firm* — David Grossman; David Yee

(57) ABSTRACT

The present invention relates to methods and systems for creating secure cookies. The methods can be used to create, receive, and transmit secure cookies, confidential cookies, and authentication cookies.

18 Claims, 15 Drawing Sheets

|  | Domain | Flag | Path | Cookie_Name | Cookie_Value | Secure | Expiration |
|---|---|---|---|---|---|---|---|
| Cookie 1 | acme.com | TRUE | / | Name | Alice | FALSE | 12/31/99 |
| ⋮ |  |  | ⋮ |  |  |  |  |
| Cookie n | acme.com | TRUE | / | Role | manager | FALSE | 12/31/99 |

FIG. 1

|  | Domain | Flag | Path | Cookie_Name | Cookie_Value | Secure | Expiration |
|---|---|---|---|---|---|---|---|
| IP_Cookie | acme.com | TRUE | / | IP_Cookie | 129.174.100.88 | FALSE | 12/31/99 |
| Pswd_Cookie | acme.com | TRUE | / | Pswd_Cookie | hashed_password | FALSE | 12/31/99 |
| KT_Cookie | acme.com | TRUE | / | Kerberos_Ticket | $\{Alice, K_{C,S}\}K_S$ | FALSE | 12/31/99 |
| Sign_Cookie | acme.com | TRUE | / | Sign_Cookie | Signature_of_Alice | FALSE | 12/31/99 |

FIG. 2

|  | Domain | Flag | Path | Cookie_Name | Cookie_Value | Secure | Expiration |
|---|---|---|---|---|---|---|---|
| Cookie 1 | acme.com | TRUE | / | Name | Alice* | FALSE | 12/31/99 |
| ⋮ |  |  |  | ⋮ | ⋮ |  |  |
| Cookie n | acme.com | TRUE | / | Role | manager* | FALSE | 12/31/99 |
| Pswd_Cookie | acme.com | TRUE | / | Pswd_Cookie | hashed_password | FALSE | 12/31/99 |
| Key_Cookie | acme.com | TRUE | / | Key_Cookie | encrypted_key* | FALSE | 12/31/99 |

Sealing Cookies

| Seal_Cookie | acme.com | TRUE | / | Seal_Cookie | Seal_of_Cookies** | FALSE | 12/31/99 |

\* Sensitive fields can be encrypted in the cookies.

\*\* Seal of Cookies can be either MAC or signed message digest of cookies.

FIG. 4

|  | Domain | Flag | Path | Cookie_Name | Cookie_Value | Secure | Expiration |
|---|---|---|---|---|---|---|---|
| Cookie 1 | acme.com | TRUE | / | Name | Alice* | FALSE | 12/31/99 |
| ⋮ | | | ⋮ | | ⋮ | | |
| Card_Cookie | acme.com | TRUE | / | Card | number::123456789*& exp_date::Jan.2000* | FALSE | 12/31/99 |
| Coupon_Cookie | acme.com | TRUE | / | Role | ID::123&off::10%* | FALSE | 12/25/98 |
| Pswd_Cookie | acme.com | TRUE | / | Pswd_Cookie | hashed_password | FALSE | 12/31/99 |
| Key_Cookie | acme.com | TRUE | / | Key_Cookie | encrypted_key* | FALSE | 12/31/99 |
| Seal_Cookie | acme.com | TRUE | / | Seal_Cookie | Seal_of_Cookies** | FALSE | 12/31/99 |

Sealing Cookies

\* Sensitive fields can be encrypted in the cookies.

\*\* Seal of Cookies can be either MAC or signed message digest of cookies.

PSWD_cookie can be replaced with one of other authentication cookies in Fig. 9

FIG. 6

|  | Domain | Flag | Path | Cookie_Name | Cookie_Value | Secure | Expiration |
|---|---|---|---|---|---|---|---|
| Cookie 1 | acme.com | TRUE | / | Name | Alice* | FALSE | 12/31/99 |
| ⋮ | | | ⋮ | | ⋮ | | |
| Ticket_Cookie | acme.com | TRUE | / | Role | ID::456&Hours::10* | FALSE | 12/25/98 |
| Pswd_Cookie | acme.com | TRUE | / | Pswd_Cookie | hashed_password | FALSE | 12/31/99 |
| Key_Cookie | acme.com | TRUE | / | Key_Cookie | encrypted_key* | FALSE | 12/31/99 |
| | | | | | Sealing Cookies | | |
| Seal_Cookie | acme.com | TRUE | / | Seal_Cookie | Seal_of_Cookies** | FALSE | 12/31/99 |

\* Sensitive fields can be encrypted in the cookies.

\*\* Seal of Cookies can be either MAC or signed message digest of cookies.

PSWD_cookie can be replaced with one of other authentication cookies in Fig. 9

FIG. 7

| | Domain | Flag | Path | Cookie_Name | Cookie_Value | Secure | Expire |
|---|---|---|---|---|---|---|---|
| Name_Cookie | acme.com | TRUE | / | Name | Alice | FALSE | 12/31/99 |
| Role_Cookie | acme.com | TRUE | / | Role | Director | FALSE | 12/31/99 |
| Life_Cookie | acme.com | TRUE | / | Life_Cookie | 12/31/99 | FALSE | 12/31/99 |
| Pswd_Cookie | acme.com | TRUE | / | Pswd_Cookie | Encrypted_Passwords* | FALSE | 12/31/99 |
| IP_Cookie | acme.com | TRUE | / | IP_Cookie | 129.174.142.88 | FALSE | 12/31/99 |

Cookie_Issuer Signs on the Cookies

| | Domain | Flag | Path | Cookie_Name | Cookie_Value | Secure | Expire |
|---|---|---|---|---|---|---|---|
| Seal_Cookie | acme.com | TRUE | / | Seal_Cookie | Digital_Signature | FALSE | 12/31/99 |

SECURE COOKIES

CROSS-REFERENCE TO RELATED APPLICATIONS

This application is a continuation of U.S. patent application Ser. No. 11/303,927, filed on Dec. 19, 2005, now U.S. Pat. No. 7,293,098, which is a continuation-in-part of U.S. patent application Ser. No. 09/451,090, filed on Nov. 30, 1999, now U.S. Pat. No. 6,985,953, which claims the benefit of U.S. Provisional Patent Application Ser. No. 60/110,217, filed on Nov. 30, 1998, all of which are hereby incorporated by reference in their entirety.

BACKGROUND OF THE INVENTION

Electronic commerce and business on the Internet is facilitated in large part by the World-Wide-Web. The HyperText Transport Protocol (HTTP) carries all interactions between Web servers and browsers. Since HTTP is stateless, it does not support continuity for browser-server interaction between successive user visits. Without a concept of session in HTTP, users are strangers to a Web site every time they access a page in a Web server.

Cookies were invented to maintain continuity and state on the Web [KM97, KM98]. Cookies contain strings of text characters encoding relevant information about the user. Cookies are sent to the user's computer (hard disk or RAM) via the browser while the user is visiting a cookie-using Web site. The Web server gets those cookies back and retrieves the user's information from the cookies when the user later returns to the same Web site. The purpose of a cookie is to acquire information and use it in subsequent communications between the server and the browser without asking for the same information again. Often times a server will set a cookie to hold a pointer, such as an identification number, as a user-specific primary key of the information database maintained in the server.

Technically, it is not difficult to make a cookie carry any relevant information. For instance, a merchant Web server could use a cookie which contains the user's name and credit card number. This is convenient for users, since they do not have to read lengthy numbers from their cards and key these in for every transaction. However, it is not safe to store and transmit sensitive information in cookies because cookies are insecure.

BRIEF DESCRIPTION OF THE DRAWINGS

FIG. 1 is an example of cookies on the Web.
FIG. 2 is an example of authentication cookies.
FIG. 4 shows a set of secure cookies on the Web.
FIG. 6 is an example of secure cookies for electronic transactions.
FIG. 7 is an example of secure cookies for Pay-per-Access.
FIG. 9 is an example of a set of secure cookies for RBAC on the Web.

DETAILED DESCRIPTION OF THE INVENTION

Figure 3:
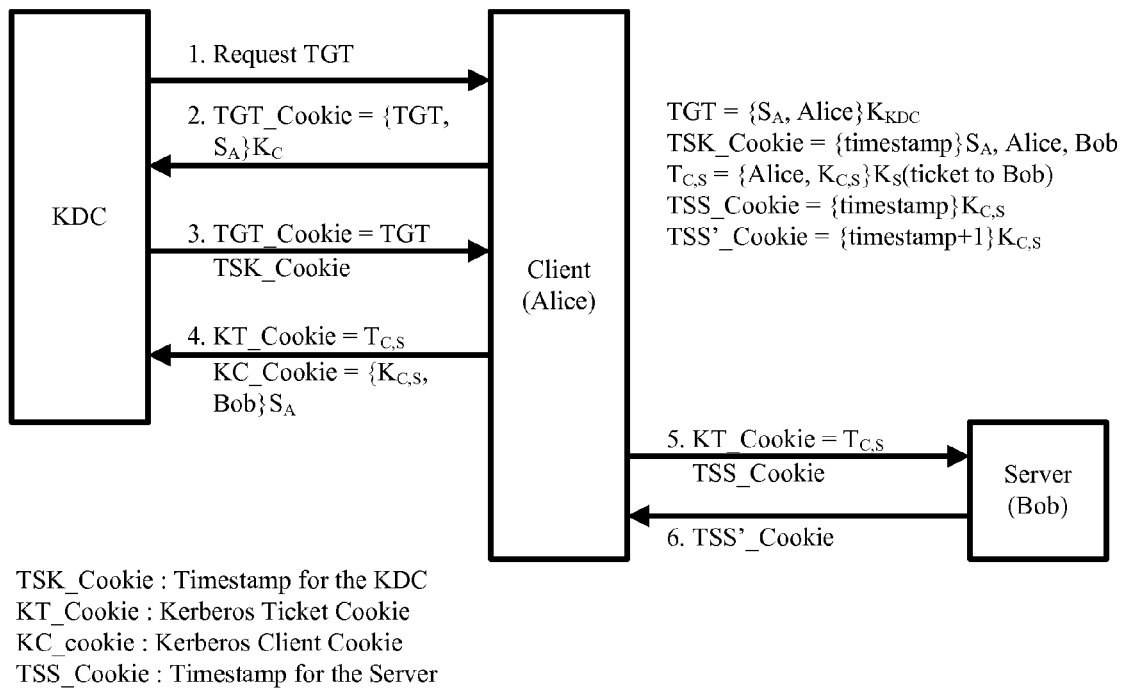
FIG. 3 shows Kerberos-based authentication with cookies.

The present invention relates to methods and devices for making secure "cookies." The present invention relates to all aspects of secure cookies, including methods of creating, receiving, and transmitting secure cookies; methods of creating, receiving, and transmitting confidential cookies; methods of authenticating cookies; methods of providing integrity to cookies; methods of transacting on the Web or Internet using secure cookies; any and all cookies used therein; and any and all devices capable of accomplishing the aforementioned methods. By the term "cookie" or "object" as used herein, it is meant a state object as described in U.S. Pat. No, 5,774,670.

Cookies are stored and transmitted in clear text which is readable and forgeable. A purpose of the present invention is describe methods and techniques to make it secure to carry and store sensitive data in cookies. We show how secure cookies enable secure attribute services between existing Web servers and browsers, and identify examples of electronic commerce and business applications for use of this technology. Secure cookies are constructed by using familiar cryptographic techniques, such as message digests, digital signatures, message authentication codes and secret-key encryption. The novelty lies in the manner in which these techniques are applied to implement secure cookies and in the Web services to which secure cookies are applied. A notable aspect is that secure cookies can be issued by one Web server for use by another. This facilitates secure attribute services on the Web by means of secure cookies.

Our techniques have varying degrees of security and convenience for users and system administrators. It is our well-founded belief that there is no such thing as absolute security. Hence, these techniques are not intended to be foolproof but rather to provide a reasonable degree of security. We will consider vulnerabilities of our techniques as we go along. An equally well-founded belief is that a one-size-fits-all approach is rarely effective in systems design. Hence, the need for a variety of techniques for secure cookies providing different tradeoffs between security and convenience for end users, system administrators and application developers.

We mention there are other techniques to make Web transactions secure without the use of secure cookies. For example the secure HTTP protocol (s-HTTP) and HTML security extensions [RS98, SR98] can be used for this purpose. Other protocols and extensions could be devised to operate in conjunction with the Secure Sockets Layer (SSL) protocol [WS96], perhaps using public-key certificates. While these possibilities are of considerable interest, our motivation for using the cookie mechanism is that it is already widely deployed in existing Web browsers and servers. The cookie mechanism is in widespread current use for maintaining state on the Web. Hence, it is of interest to see how it could be secured.

The secure cookies mechanisms described in this paper can co-exist with SSL and in some cases actually use SSL for securing some aspect of the overall mechanism. SSL facilitates server-to-client authentication which (for the most part) secure cookies do not address. SSL can also be used to encrypt cookies in transit on the network. We assume the reader is familiar in general outline with SSL and we will rely on it for server-to-client authentication where needed. In a few cases we will use SSL to support secure cookies.

If cookies are to be used to provide the classic security services of integrity, authentication, confidentiality and authorization, we must somehow secure them. As shown herein, this can be done with existing Web servers and browsers.

A preferred embodiment of the present invention relates to a method of creating an http client authentication object, comprising one of more of the following steps in any order: requesting an http file on a http server; retrieving conforming client data; inputting said conforming client data into a http client authentication object; encrypting the client authentication object; transmitting the http client authentication object; and storing the http client authentication object in a storage means on an http client computer means.

The method involves creating an http client authentication object. HTTP is short for HyperText Transfer Protocol and refers to a stateless protocol, or method of transmission, used most commonly in the implementation of the World Wide Web. Although this disclosure is written primarily in terms of HTTP, any language, or means, for transmitting information from one computer to another can be used to implement the present invention. By the term, "client authentication object," it is meant any data structure created by an executable program on the server to be used in the authentication of clients.

In the preferred embodiment of the invention, the process is initiated when an internet or intranet user (e.g., "http client") sends a transmission requesting certain information, e.g., a request for an http file from a http server. The server then uses this transmission to retrieve conforming client relating to that particular client. The conforming data retrieved by the server can come from magnetic media or an optical storage device or the server can initiate a secondary transmission to the client requesting information to be used in future transactions. Any type of conforming client data can be used, including, e.g., IP address, password, etc., which is useful for authentication purposes, i.e., to confirm the client's identity. For example, when assigned statically, the IP address is a 4-12 digit number that will uniquely identify a particular client. This address can be ascertained by the http server in a fairly straightforward manner from the packet header. Another type of client data can be a Kerberos ticket. Kerberos is an authentication standard developed at the Massachusetts Institute of Technology and allows the server to authenticate the source of a transmission by requiring that the client include a pre-created authentication object, or ticket, with each transaction. This ensures that an intermediary source is not attempting to send his own packet and "spoof" it as originating from the client. Other examples are discussed in more detail below.

The server handles the creation of the authentication object in a slightly different manner when the client's password or other sensitive information is among the set of data to be contained in the object. The invention calls for encryption of this data before the cookie is sealed so as to ensure confidentiality in the transmission and also while the data is stored on either the server or the client's storage medium. Types of data which can utilize this extra layer of encryption include social security numbers, credit card numbers, client private encryption keys, hashing keys as well as passwords. Upon receiving the password, the server then encrypts that password using either its private encryption key or a hashing algorithm. It then stores the hashed or encrypted password in its own sub-object to become part of the final authentication object.

Once the server has the data it requires either from disk retrieval or via the secondary transmission to the client, it then can create the final http client authentication object. In preferred embodiments, this object is comprised of a set of sub-objects such as the password object as described above. The server can "seals" the final object by using its private key, for example, one generated by either a MD5 or SHA algorithm. This seal gives the client the capability to ensure that the cookie was not tampered with during transmission, providing the data integrity element of the invention. The server then transmits the sealed authentication object to the client. Upon receipt, the client stores it on some type of storage means for use in later transactions with the server.

2. Cookies

At present, there are many browsers that support cookies including Netscape, MS Internet Explorer, GNNWorks, NetCruiser and OmniWeb. There are basically three modes of cookie management in browsers. The first mode is to simply refuse all cookies without asking. The second mode is to accept all cookies and offers users the ability to delete all of them at once. The last provides more options to users. A user can decide to accept cookies from designated sites.

Cookies have been used for many purposes on the Web such as selecting display mode (e.g., frames or text only), shopping cart selections, and carrying names, passwords, account numbers, or some other bits of identifying data on the user's machine. The possible applications are endless since cookies are a general mechanism to save and replay relevant application-dependent data. Contrary to some discussions in the popular press, cookies can-not interact with other data on the user's hard drive, nor can they capture anything from it. They can only save and retrieve information placed therein by Web servers. However, addressing the legitimate security concerns raised by cookies is a non-trivial matter.

2.1. Cookie Specifications

Although there are many ways to use cookies on the Web, the basic process and the contents of cookies are based on the following description. FIG. 1 shows an example of cookies.

To create a cookie for a Web site, the server sends a Set_Cookie header line as follows after a browser requests a URL access to the site:

SET-Cookie: Cookie_Name=Cookie_Value; expire=Date; domain=Domain_Name; path=Path; Secure_Flag=boolean; Flag=boolean Cookie_Name and Cookie_Value have the actual information we want to keep in the cookie. We can have multiple Cookie_Name and Cookie_Value pairs in a cookie which appears as one to the browser.

Date is the valid lifetime of the cookie. By default, the cookie is set to expire when the browser is closed. If the expiration date is set, the cookie will no longer be stored when the expiration date has been reached.

Domain_Name is a host or domain name where the cookie is valid. When a server is looking for the cookies for a particular Web site, a comparison of the Domain_Name is made with the actual Internet domain name of the host. For instance, this field could have domain=acme.com as a domain name.

Flag specifies whether or not all machines within a given domain can access the variable in the cookie. If true all servers in the specified Domain_Name can use the cookie (and the browser will supply the cookie to all servers in that domain). If false Domain.Name is interpreted as a host name, which is the only host to whom the browser will give that cookie.

Path sets the valid path at the domain for the cookie. The most general path is "/". For instance, the path "/foo" would match "/foodoc" and "/foo/index.html".

If a cookie is specified "secure", the cookie will only be transmitted over secure communications channels such as SSL [WS96] connection.

All of the above fields are optional except Cookie_Name and Cookie_Value. Whenever a browser which has some cookies sends an HTTP request for a URL to a Web sever, the request includes a line of the following form.

Cookie: Cookie_Name1=Cookie_Value1; Cookie_Name2=Cookie_Value2; ...

Only those cookies relevant to that server (by virtue of Domain_Name and Flag fields) will be sent by the browser.

If the server finds any cookies which are applicable for the server, those cookies are used during this communication between the browser and the server. However, if the server does not find any cookies specified for it, either that server does not use cookies in the communication or the server creates new cookies for subsequent communication between the browser and the server. Furthermore, servers may update the contents of their cookies for any specific circumstance. The issuer of the cookies is not important for cookies' validation. In other words, a server can create cookies for other servers in the domain. This is an important aspect of cookies which is used for our applications described in section 4.

2.2. Security Concerns in Cookies

Cookies are often used by Web servers to tag visitors, to identify who they are and what they are up to. For instance, if a merchant Web site has a customer database which contains customers' information such as names, addresses, payment histories, merchandising histories, and credit card numbers, the Web site creates and uses cookies to store pointers to individual customer records in the customer database. It is efficient to store a simple ID number of a customer in a cookie rather than to store all of the customer's information in the cookie. Moreover, this ID number can be exposed in a cookie without exposing the actual customer data.

Cookies are electronic notes for Web servers stored on the browser side. Some people may be concerned that any random site could read the cookies on a user's hard disk, or if cookies could be used to steal information from a user's hard disk. Fortunately, there is no way a cookie can examine the contents of the user's hard drive, nor can it release the user's private data on the Web. Therefore, if cookies do not carry any sensitive information about the user, or the sensitive information is not in plain text, (for instance, if cookies carry encrypted text of sensitive information), we can achieve confidentiality of data transmitted in cookies.

2.3. Security Threats to Cookies

However, what if a malicious user changes the contents of the cookies? What if a malicious user uses cookies of other people, perhaps stolen from their computers? What if a malicious user collects cookies from other people and extract some sensitive information such as credit card numbers or passwords? Actually, these attacks are easy to carry out, since cookies are stored in plain text somewhere on the user's hard disks. A user, say Alice, can change the contents of her cookies, such as ID numbers to a Web site, and access the Web site with the forged cookies. Alice can make a copy of cookies from Bob's machine to her machine, and easily can impersonate Bob in the Web sites that accept Bob's cookies. Furthermore, if Alice can impersonate a site that accepts Bob's cookies, or if she penetrate one such site, Bob's browser sends Alice all the cookies from that domain. Then, Alice can use the harvested cookies for all other sites within the domain. Therefore, cookies are not a right place to store sensitive information, such as, passwords, credit card numbers, purchase authorization numbers, and so on.

We distinguish three types of threats to cookies: network security threats, end-system threats and cookie-harvesting threats. Cookies transmitted in clear text on the network are susceptible to snooping (for subsequent replay) and to modification by network threats. Network threats can be foiled by use of the Secure Sockets Layer (SSL) protocol [WS96] which is widely deployed in servers and browsers. However, SSL can only secure cookies while they are on the network. Once the cookie is in the browser's end system it resides on the hard disk or memory in cleartext. Such cookies can be trivially altered by users and can be easily copied from one computer to another, with or without connivance of the user on whose machine the cookie was originally stored. We call this the end-system threat. The ability to alter cookies allows users to forge authorization information in cookies and to impersonate other users. The ability to copy cookies makes such forgery and impersonation all the easier. Additionally, if an attacker can harvest cookies by impersonating a site that accepts users' cookies, later he can use the harvested cookies for all other sites which accept those cookies. We call this the cookie-harvesting threat. Now, we will describe how to protect cookies from these threats in the following section.

2.4. Related Technologies

For secure communications on the Web, we may consider using other existing technologies, such as, SSL (Secure Socket Layer [WS96]), which supports a secure channel between the server and the user's machine on the Internet. However, SSL cannot solve the stateless problem of HTTP. Furthermore, even though a user can receive cookies from the server over a secure SSL-protected channel, it does not mean that we can trust the user. For instance, once Alice receives some cookies from the server over a secure channel, she can change the contents of the cookies or give them to other people. Then, Alice or the person who is impersonating Alice can access the server which accepts the cookies over a SSL secured channel using the forged cookies. However, as we will see in this paper, SSL can be used as a part of our solution to protect information on the Web.

3. Cooking Secure Cookies

Secure cookies provide three types of security services: authentication services, integrity services, and confidentiality services. Authentication services verify the owner of the cookies. Integrity services protect against the threat that the contents of the cookies might be changed by unauthorized modification. Finally, confidentiality services protect against the values of the cookies being revealed to unauthorized entity. In this section, we describe how to transform regular cookies shown in FIG. 1 which have zero security, into secure cookies which give us the basis for providing security services. We consider authentication, integrity and confidentiality of cookies in turn below.

3.1. User Authentication for Cookies

It is already possible to use cookies on the Web between existing Web servers, and browsers. However, a malicious user can simply snatch the cookies of other people and impersonate the real owner of the cookies in the server which accepts those cookies. To solve this problem we identify four possible authentication methods for cookies: address-based authentication, password-based authentication, Kerberos-based authentication, and digital-signature-based authentication. FIG. 2 shows the authentication cookies. Note that we will use one of those authentication cookies in FIG. 2 with regular cookies in FIG. 1. The choice of an authentication cookie depends on the situation.

3.1.1. Address-Based Authentication

We use the IP_Cookie which grabs the IP address of user's machine for address-based authentication to protect malicious users from impersonating the original owner of the cookies. Since the IP address is one of the environment variables for a user on the Web, it is not difficult for a server to grab the user's IP address and put it into the IP_Cookie by internal procedures such as CGI scripts in the server. Now, whenever Alice tries to access the server which accepts the cookies, the server checks first if Alice's current IP address is same as the one in the IP_Cookie Alice sent to the server. If they are identical, the server believes that Alice is the real owner of those cookies.

It is very convenient for users to use their IP addresses as simple authentication information, since users do not need to enter their authentication information during communication between servers and browsers. However, in some cases, using the user's IP address for authentication is not a good solution. For example, what if Alice's IP address is dynamically assigned to her machine whenever she connects to the Internet? In this case, even though Alice is using the same machine as before, the cookies that Alice received in a previous internet connection are not valid any more once the IP address is changed. Furthermore, if Alice's domain uses a proxy server to reach Bob, an attacker can collect Alice's cookies by the cookie-harvesting and can easily impersonate Alice to Bob through the same proxy server which effectively provides the same IP number to multiple users. In addition, we cannot avoid the IP spoofing problem whenever we use IP addresses for some purposes on the Internet. Therefore, to avoid the above problems in such cases, we need to use one of the rest of the authentication cookies described as follows.

3.1.2. Password-Based Authentication

To support users who use dynamic IP addresses, and avoid IP spoofing, we can use password-based authentication. In other words, if the server grabs Alice's password first and puts the hash of the password into a cookie, call it Pswd_Cookie, servers can authenticate the owner of the cookie. Alice is required to type her password for verification whenever she tries to access other servers which accept those cookies. If the hash of the password she entered is same as the one in her Pswd_Cookie, then the server believes Alice is the real owner of those cookies. Alternatively, servers can use an encrypted password instead of the hash of the password in the Pswd_Cookie to authenticate the owner of cookie (detailed encryption process is described in the following subsection). As a result, no one but Alice can use those cookies on the Web. However, this mechanism requires users to enter their passwords for authentication whenever they connect to the site, while using IP_Cookie is transparent to users.

3.1.3. Kerberos-Based Authentication

We can also use Kerberos [SNS88, Neu94] with cookies for mutual authentication. We assume the reader is familiar in general terms with the Kerberos protocol. An http adaptation of the Kerberos protocol is shown in FIG. 3. Kerberos is a secret-key based authentication service in a network. To use Kerberos with cookies for authentication, the user needs additional browser software to replace the value of the cookie (TGT_Cookie), which is containing a ticket-granting ticket (TGT), and generate authenticators ($\{timestamp\}S_A$, $\{timestamp\}K_{C, S}$) in the TSK_Cookie and the TSS_Cookie respectively. Furthermore, we need modify the Kerberos protocol slightly to make the Kerberos ticket cookie, KT_Cookie, be able to work with other secure cookies, which especially support integrity of cookies.

FIG. 3 shows how Alice logs into Bob through the KDC (Key Distribution Center) with a KT_Cookie. The KDC shares a secret key with each principal in the domain. During the initial login, Alice asks the KDC for a session key, $S_A$, and a ticket-granting ticket (TGT), which is encrypted by the KDC's master key, $K_{KDC}$. Then, Alice receives $\{TGT, S_A\}K_C$ (encrypted with Alice's secret key, $K_C$) stored in the TGT_Cookie from the KDC.

Alice decrypts the encrypted $S_A$ and the TGT using her secret key, $K_C$. Then, Alice replaces the value of the TGT_Cookie with the TGT and removes $\{TGT, S_A\}K_C$ from her machine. Practically, it is possible for Alice to create another cookie containing the TGT. However, keeping $\{TGT, S_A\}K_C$ in Alice's machine for a long time is not a good idea from a security point of view once Alice does not need it any more.

When Alice later needs to access a remote server (say Bob), Alice connects to the KDC with the TGT_Cookie, along with the TSK_Cookie, which is generated by Alice's machine to carry an authenticator ($\{timestamp\}S_A$) and the name of the remote server, Bob. The KDC verifies the timestamp and decrypts the TGT to discover $S_A$. Then, the KDC creates both the Kerberos client cookie, KC_Cookie, containing $\{K_{C, S}, Bob\}S_A$ for Alice and the Kerberos ticket cookie, KT_Cookie, containing $T_{C, S}$ (encrypted with Bob's secret key) for Bob. As a result, the KDC sends Alice $\{K_{C, S}, Bob\}S_A$ and $T_{C, S}$ separately.

According to the original Kerberos protocol, the KDC is supposed to encrypt those values all together and send $\{K_{C, S}, T_{C, S}, Bob\}S_A$ to Alice in one cookie. However, this approach gives us a limitation for using the KT_Cookie with other secure cookies. For instance, if we need to use a KT_Cookies with regular cookies in FIG. 1 for authentication, we may also consider about the integrity of the cookies which can be supported by another secure cookie, Seal_Cookie (described in section 3.2). By the original Kerberos protocol, users must change the contents of the cookie or generate another cookie to make a cookie which has the ticket to Bob ($T_{C, S}$). This obviously conflicts with the integrity of the cookies. Therefore, the KDC is required to create two separate cookies (KC_Cookie and KT_Cookie) and send them to Alice.

When Alice connects to Bob, the KT_Cookie and the TSS_Cookie, which is generated by Alice's machine containing an authenticator ($\{timestamp\}K_{C, S}$) are sent by Alice to Bob. To provide mutual authentication, Bob responds to the authenticator. Now, Alice believes that she is connecting to Bob, since Bob was able to decrypt the ticket in the KT_Cookie, which meant he knew $K_{C, S}$ encrypted with $K_S$.

3.1.4. Digital-Signature Based Authentication

If servers know users' public keys, the digital signature technologies such as DSA [Fed91] and RSA [RSA78] can be used to authenticate users with cookies. To use this method, the user needs additional browser software to generate a cookie which contains a signed timestamp. For instance, when Alice needs to access a remote server (say, Bob), who knows Alice's public key, Alice's machine generates a timestamp and creates the Sign_Cookie shown in FIG. 2, which has Alice's digital signature (signed with her private key) on the timestamp. When Alice connects to Bob, he receives the Sign_Cookie from Alice and verifies the signature with her public key.

3.2. Providing Integrity to Cookies

Figure 5:
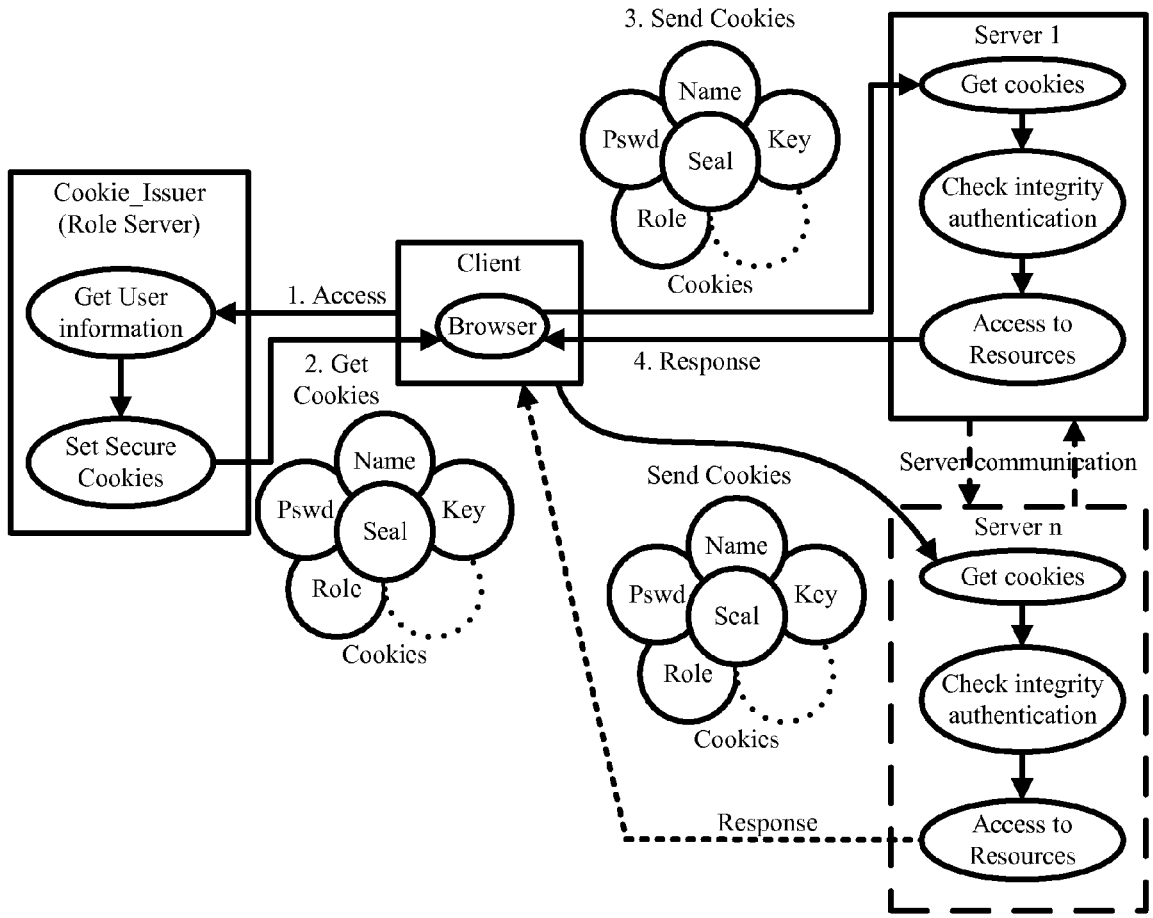
FIG. 5 is an illustration of how to use secure cookies on the Web.

There are also integrity problems with cookies. For instance, if an attacker wants to impersonate Alice who uses the IP_Cookie, he can copy the IP_Cookie from Alice and edit it with his IP number, then impersonate Alice in the domain which accepts the IP_Cookie. FIG. 4 shows a set of secure cookies and FIG. 5 shows how the secure cookies are used with regular cookies on the Web. The regular cookies and the authentication cookie have the same purposes as we described in the previous subsection. The Seal_Cookie is being used to determine if the contents of the cookies have been altered. The contents of the Seal_Cookie depends on the cryptographic algorithm used for the cookie. The key distribution between servers can be achieved by key agreement algorithms such as RSA [RSA78] or Diffie-Hellman [DH97].

3.2.1. Public-Key-Based Solution

In the case of using public-key technology, the server creates a message digest from the rest of the cookies using a message digest algorithm such as MD5 [Riv92] or SHA [Fed95], signs it using the server's private key and puts the signature in the Seal_Cookie.

When the user returns to the same domain by accessing one of servers in the domain with the set of secure cookies, the server gets all cookies for the site from the user. Any server in the domain can verify the signature in the Seal_Cookie using the public key of the cookie-issuing server. If the integrity verification is successful, then there has been no alteration in the cookies. If the cookies are valid, the server allows the user to execute transactions based on the values denoted in the cookies.

In some cases, if we do not need the confidentiality of information in cookies, for example, when we use cookies without sensitive information, we do not need encryption mechanism. Specifically, we do not need the Key_Cookie (described in section 3.3). Furthermore, servers do not need to have a shared pair of public-key and private-key. However, in this case, only the server which has the private key in the domain can update the contents of the cookies for any specific circumstance. For instance, when we need to update the contents of the cookies, the user has to go back to the server which has the private key to renew them unless servers have a shared pair of public-key and private key, because the updated cookies need the digital signature by the server's private key.

3.2.2. Secret-Key-Based Solution

In the case of using the secret-key cryptography, the server creates an integrity-check value from the rest of the cookies by using key-dependent one-way hash function such as HMAC [BCK96], and puts it in the Seal_Cookie. When a user returns to the same domain by accessing one of the servers in the domain, the server obtains all cookies for the site from the user. Assuming that each server in the domain has a secret key shared with other servers, the server creates a keyed-hash value from the cookies except the Seal_Cookie and compare it with the one in the user's Seal_Cookie. If both of the values are identical, the server believes that there has been no alteration in the cookies.

Furthermore, if we use the secret-key based solution for secure cookies, any server which has the shared secret key in the same domain can update the contents of the cookies for any specific circumstance. For instance, if a server needs to extend the expiration date of the cookies, the user does not have to go back to the server which created the cookies to renew them.

3.3. Providing Confidentiality to Cookies

Finally let us consider how to protect other people, or perhaps even the cookie owner, from reading sensitive information in the cookies. To do so, sensitive information, such as, names, roles and credit card numbers can be encrypted by the server and stored in cookies. We use the Key_Cookie shown in FIG. 4 to store an encrypted session key, which was used to encrypt sensitive information of other cookies. The session key can be encrypted either by the server's public key or by the server's secret key which is shared with other servers in the domain. We may encrypt the contents of the cookies with the server's secret key or public key directly (we do not need the Key_Cookie in this case). However, for more secure services, we recommend using a session key for confidentiality services with cookies. In the case of using the public-key cryptography for encryption, we recommend using separate public-key pairs for encryption and for digital signature since servers can share the private key for information decryption while keep the private key for digital signature secret.

When a server receives secure cookies including the Key_Cookie, the server decrypts the value of the Key_Cookie by using it's master key (private key or secret key) which can be shared with other servers, and gets the session key which was used to encrypt sensitive information in other cookies. Then, the server decrypts and reads the encrypted information in the cookies using the session key. If the contents of the cookies were encrypted by the server's secret key or public key (Key_Cookie is not required), the server decrypts the encrypted information in the cookies using the corresponding key directly. After the server checks the validity of all the cookies, it allows the user to execute transactions based on the values denoted in the cookies.

3.4. Discussion

SSL can be used to provide one possible alternative to make systems more secure and efficient. Suppose we have hundreds of servers in an organization which needs integrity, authentication and confidentiality services in cookies. It is not a good idea to make individual servers share a secret key with other servers in the domain since this increases exposure of the secret key. To support more secure service, several verification servers can be used which have the secret key shared with other verification servers to verify, decrypt or update cookies issued by cookie-issuing servers in the domain. Now, the remaining servers do not need to have the shared secret key. When a cookie-using server receives a set of secure cookies from a user, the cookie-using server asks one of those verification servers if the cookies are valid. Then, the verification server verifies the cookies and sends the result to the cookie-using server in plain text over the secure channel achieved by SSL. Furthermore, if it is necessary, the verification server can update some information in the cookies. Finally, the server allows the user to execute transactions in the server based on the information received from the verification server.

TABLE 1

Summary of the Recipes for Secure Cookies

| Effect | SSL | Auth IP | Pswd* | KT, Sign | Seal | Auth + Seal | Auth + Key + Seal |
|---|---|---|---|---|---|---|---|
| Network Threats | ○ | X | X | X | X | ○ | ○ |
| End System Threats | X | X | X | X | X | ○ | ○ |
| Cookie-Harvesting Threats | ○ | X† | ○ | ○ | X | DA | DA |
| Information Hiding | No | No | No | No | No | No | Yes |
| Additional Client Software | NR | NR | NR | R | NR | DA | DA |
| IP Spoofing | ○‡ | X | NO | NO | | DA | DA |

TABLE 2

Legend for Table 1

| Symbol | Representation |
|---|---|
| ○ | Can solve the problem |
| X | Cannot solve the problem |
| R | Required |
| NR | Not required |
| DA | Depends on the authentication cookie |
| * | Password protected by SSL during verification |
| † | IP_Cookie cannot solve the cookie-harvesting threats when users use a proxy server |
| ‡ | SSL can protect the IP spoofing problem by requiring client-to-server authentication |

3.5. Comparison of the Recipes and Effects of Secure Cookies

A summary of the recipes for secure cookies on the Web is shown in Table 1. Regular cookies are susceptible to the network threats, the end-system threats, and cookie-harvesting threats (see section 1). Actually, there is no security in regular cookies. Since SSL provides server-to-client authentication (optionally mutual authentication is possible by requiring client-to-server authentication) and data encryption on the Web, SSL can protect cookies from the network threats, IP spoofing, and cookie-harvesting threats. However, it cannot protect cookies from the end-system threats. One of the authentication cookies (IP_Cookie, Pswd_Cookie, KT_Cookie, or Sign_Cookie) and Seal_Cookie can be used to provide authentication and integrity services to cookies respectively. If authentication is dependent on IP addresses, IP spoofing remains a threat. Furthermore, IP_Cookie cannot protect cookies from the cookie-harvesting threats if users use a proxy server. On the contrary, if servers use the Pswd_Cookie (carrying the hash of user's password), the KT_Cookie (carrying the Kerberos ticket), or the Sign_Cookie (carrying user's digital signature), authentication has neither IP spoofing exposure nor cookie-harvesting threats. However, using Pswd_Cookie requires users to enter their authentication information for each server in the domain and requires SSL to protect the password on the network and to achieve server-client authentication (so as to prevent server spoofing). Use of the IP_Cookie is transparent to users. Using KT_Cookie supports mutual authentication between clients and servers. However, using either the KT_Cookie or the Sign_Cookie requires additional browser software to deal with ticket-granting tickets and authenticators. Additionally, if cookies have some sensitive information which are needed to be encrypted by a session key, Key_Cookies can be used with other secure cookies to store the encrypted session key as shown in the table.

4. Applications of Secure Cookies

In this section, we introduce some applications of secure cookies. This is a representative sample and many other applications can be imagined.

4.1. User Authentication

Web servers can use secure cookies to authenticate their visitors. Detailed procedures how to make and use those cookies are described in section 3.1.

Address-based authentication is very convenient since it can be processed without users' cooperation, such as, entering authentication information, assuming that the identity of the owner of the cookies can be inferred based on the IP address from which cookies arrive. However, it cannot support users who use dynamic IP addresses, and has IP spoofing exposure. Furthermore, in the case that users use a proxy server, address-based authentication is susceptible to the cookie-harvesting threats.

Password-based authentication can solve the above problems but requires user intervention to enter a password on each authenticated connection. From a user's point of view, this procedure is not different from the one in conventional method. In other words, a user must enter his or her authentication information whenever the user connects to the site. However, if servers use the secure cookies for user authentication, they do not need user authentication databases, which cause a single point attack, since each user's information is distributed to user's cookies and stored in his or her hard drive securely.

Kerberos can be used with cookies to support mutual authentication between servers and clients as we described in the previous section. However, to use Kerberos with cookies, the user needs additional browser software to replace the value of the cookie containing a ticket-granting ticket (TGT), TGT_Cookie, and deals with authenticators ($\{timestamp\}S_A$, $\{timestamp\}K_{C, S}$). Furthermore, to make it possible for the KT_Cookie to work with other secure cookies such as Seal_Cookie, the KDC is required to create two separate cookies (KC_Cookie and KT_Cookie) and send them to the client.

If servers know users' public keys, the digital signature technology can be used for authentication services with cookies. However, the user needs additional browser software to generate the cookie containing a signed timestamp which is acceptable to the server.

4.2. Electronic Transactions

Because of the regular cookies' insecurity, a merchant site usually sets a cookie to hold just a pointer such as an ID number which is a key field of the customer-information database in the site. However, this implies that a customer-information database must be maintained on a server. One of the disadvantages of this method is that if the server keeping customers' information is penetrated by an attacker, all the customers' information, such as credit card numbers, preferences, addresses and other sensitive information in the server are open to the attacker. Furthermore, if a domain has multiple servers with multiple customer-information databases, maintenance and synchronization of this information is burdensome. There are also significant privacy concerns about data stored by servers, since such data can easily be misused. Users may feel more comfortable with servers that pledge not to maintain such data.

Secure cookies can solve these problems especially in the electronic commerce field. If a merchant site creates and uses the set of secure cookies shown in FIG. 6, the site does not need to have a customer information database unless the site needs to track customers' access histories since each customer's sensitive information is distributed and stored securely in the customer's hard disk. The secure cookies provide a more secure environment by eliminating customer-information databases which can cause a single point failure. Furthermore, the merchant can reduce the cost for the maintenance of customer-information databases.

The Card_Cookie has multiple pairs of Cookie_Name and Cookie_Value in its Cookie_Value as described in section 2. Intuitively, a merchant site should set the Card_Cookie to expire before the actual expiration date of the credit card. For more convenient services, the merchant can issue special tokens for customers such as electronic coupons which contains coupon's ID number and discount information. For instance, if Alice received an electronic coupon along with other secure cookies, she can use it before the coupon's expiration date in the merchant site. In this case, the merchant site needs to keep a record for the coupon to protect replay usages of the same coupon.

4.3. Pay-per-Access

Today, many pay-per-access sites provide various information services such as performances, games, movies, and other special events in the Web environment. Therefore, it is obvious that we need secure mechanisms to sell/buy and use tickets to such sites on the Web.

Secure cookies can be used to solve this problem. Suppose Alice wants to buy an access to a pay-per-access site. After Alice pays for the access to the site, the server has to give her a token which allows Alice to access the site until the ticket expires. If Alice receives a cookie, let's call it Ticket_Cookie, which contains her access limit, along with other secure cookies, she can access the site as long as the Ticket_Cookie is valid. No one but Alice can use her secure cookies. FIG. 7 shows an example of a set of secure cookies for Pay-per-Access sites on the Web.

The access limit in the Ticket_Cookie is controlled either by time or by the number of connections. For instance, if a merchant site issues a 10-hour (or 10-time) ticket to Alice, the site allows Alice to use its resources up to 10 hours (or 10 times) until her Ticket_Cookie expires.

A merchant site could control a customer's access limit by simply updating the content of the Ticket_Cookie with customer's residual access limit (hours or the number of times). However this is not a good idea since a smart and malicious customer can access the site more than his or her access limit. For instance, if Alice uses a copy of a whole set of her initial secure cookies including the Ticket_Cookie, then she can have unlimited access to the site until the cookies expire because the merchant site has no idea about customers' replays.

Therefore, to protect malicious customers from replay attack, a merchant site needs to keep information about tickets such as accumulated usage of each ticket at least until the Ticket_Cookie expires. This does not mean that the merchant site needs to keep all the customer information. In other words, only the ticket ID and its accumulated usage are required to be tracked by the merchant site. In this case, merchant sites do not need to update the contents of the cookies. For instance, if Alice's accumulated access usage becomes more than the access limit denoted in her Ticket_Cookie, then the merchant site rejects Alice's request.

4.4. Role-Based Access Control on the Web
4.4.1. Overview

Role-Based Access Control (RBAC) is a promising alternative to traditional discretionary and mandatory access controls, which ensures that only authorized users are given access to certain data or resources. It also supports three well-known security policies: data abstraction, least-privilege assignment, and separation of duties [FCK95, SCFY96].

A role is a semantic construct forming the basis of access control policy. With RBAC, system administrators can create roles, grant permissions to those roles, and then assign users to the roles on the basis of their specific job responsibilities and policy. Therefore, role-permission relationships can be predefined, which makes it simple to assign users to the predefined roles. Without RBAC, it is difficult to determine what permissions have been authorized for what users.

Figure 8:
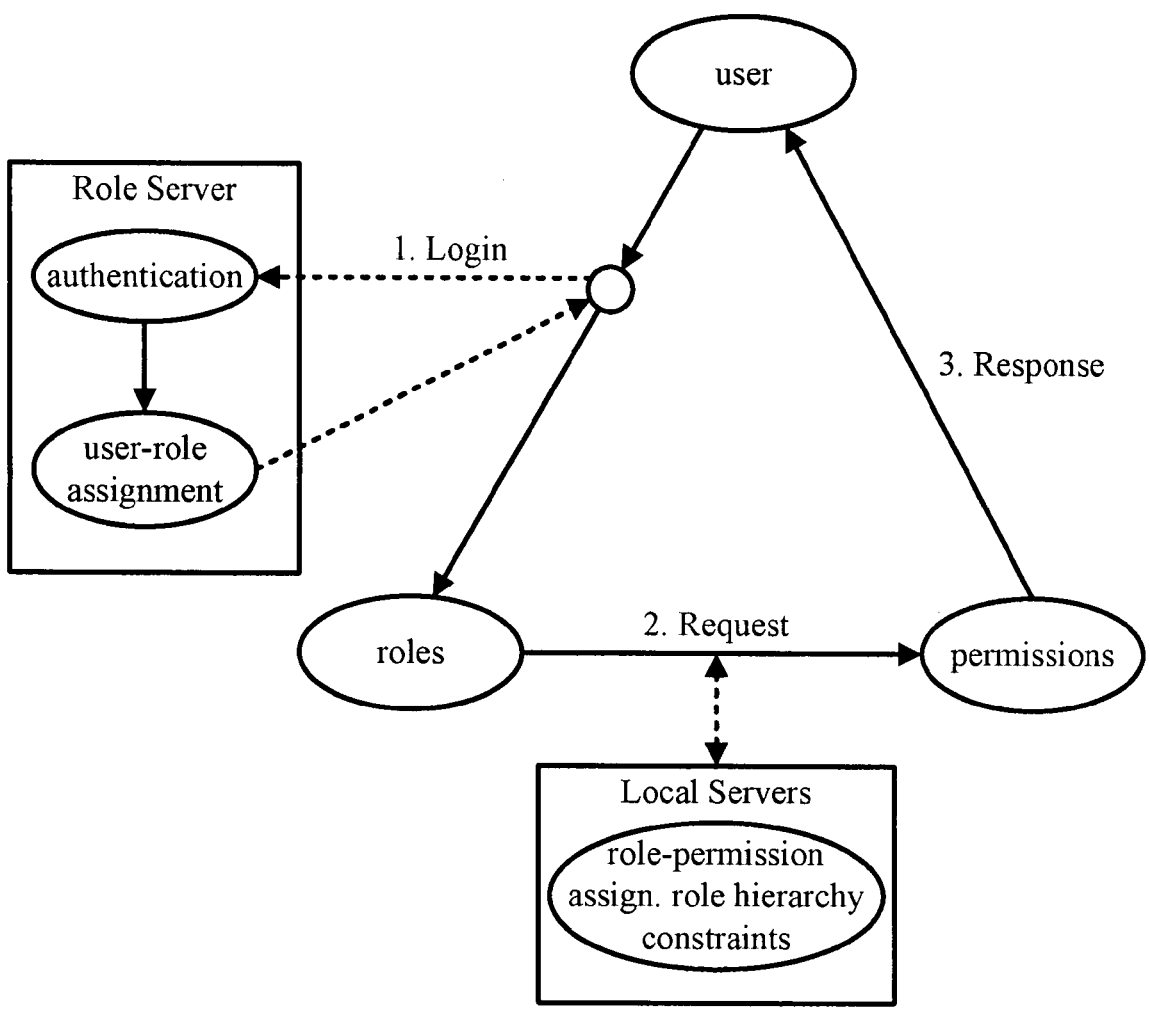
FIG. 8 is a schematic of RBAC on the Web.

FIG. 8 shows a schematic of RBAC on the Web. If a user, let's say Alice, wants to execute transactions in local servers, she needs access to the role server first in the beginning of the session. After the role server authenticates Alice, it finds Alice's explicitly assigned roles and sets role cookies. Subsequently, it creates an authentication cookie (IP_Cookie, Pswd_Cookie, KT_Cookie, or Sign_Cookie), Key_Cookie, and Seal_Cookie to make the cookies secure as shown in FIG. 4. As a result, those secure cookies are stored securely in Alice's hard drive so that Alice does not need to go back to the role server to get her assigned roles until the cookies expire. Technically, we can make any local servers belong to the same domain regardless of their physical location by DNS (Domain Name Service) configuration.

When a local server receives a request from Alice, it gets all the related cookies, in other words, a set of secure cookies for that domain, from Alice's browser and verifies the contents of the cookies first. If all the cookies are valid, the local server allows Alice to execute transactions in the server based on her assigned roles.

4.4.2. Introduction

Current approaches to access control on Web servers do not scale to enterprise-wide systems, since they are mostly based on individual users. Therefore, we were motivated by the need to manage and enforce the strong access control technology of RBAC in large-scale Web environments. RBAC is a successful technology that will be a central component of emerging enterprise security infrastructures. Cookies can be used to support RBAC on the Web, holding users' role information. However, it is insecure to store and transmit sensitive information in cookies. Cookies are stored and transmitted in clear text, which is readable and easily forged.

In this paper, we describe an implementation of Role-Based Access Control with role hierarchies on the Web by secure cookies. Since a user's role information is contained in a set of secure cookies and transmitted to the corresponding Web servers, these servers can trust the role information in the cookies after cookie-verification procedures and use it for role-based access control. In our implementation, we used CGI scripts and PGP (Pretty Good Privacy) to provide security services to secure cookies. The approach is transparent to users and applicable to existing Web servers and browsers.

WWW is commonplace. Increased integration of Web, operating system, and database system technologies will lead to continued reliance on Web technology for enterprise computing. However, current approaches to access control on Web servers are mostly based on individual users; therefore, they do not scale to enterprise-wide systems.

A successful marriage of the Web and a strong and efficient access control technology has potential for considerable impact on and deployment of effective enterprise-wide security in large-scale systems. Role-based access control (RBAC) [San98] is a promising technology for managing and enforcing security in large-scale enterprise-wide systems, and it will be a central component of emerging enterprise security infrastructures. We were motivated by the need to manage and enforce the strong access control technology of RBAC in large-scale Web environments.

To support RBAC on the Web, we chose a relatively mature technology, cookies—widely used on the Web—and have extended it for our purpose. Cookies were invented to maintain continuity and state on the Web [KM97, KM98]. Cookies contain strings of text characters encoding relevant information about the user. Cookies are sent to the user's memory via the browser while the user is visiting a cookie-using Web site, and are stored on the user's hard disk after the browser is closed. The Web server gets those cookies back and retrieves the user's information from the cookies when the user later returns to the same Web site or domain. The purpose of a cookie is to acquire information and use it in subsequent communications between the Web server and the browser without asking for the same information again. Often a Web server gets a cookie to hold a pointer, such as an identification number, as a user-specific primary key of the information database maintained in the server. Technically, it is not difficult to make a cookie carry relevant information. For instance, a merchant Web server could use a cookie containing the user's name and credit card number. This is convenient for users, since they do not have to read lengthy numbers form their cards and key these in for every transaction. However, it is not safe to store and transmit this sensitive information in cookies because cookies are insecure. Cookies are stored and transmitted in clear text, which is readable and easily forged. Therefore, we should render secure cookies to carry and store sensitive data in them.

We will provide secure cookies with three types of security services: authentication, integrity, and confidentiality. Authentication services verify the owner of the cookies. Integrity services protect cookies against the threat that the contents of the cookies might be changed by unauthorized modification. Finally, confidentiality servers protect cookies against the values of the cookies being revealed to an unauthorized entity. Details for these techniques have varying degrees of security and convenience for users and system administrators.

For secure communications on the Web, we may consider using other existing technologies, such as, SHTTP (Secure HTTP [RS98, SR98]) and SSL (Secure Socket Layer [WS96]). However, these technologies cannot solve the stateless problem of HTTP. Furthermore, none of these can prevent end-system threats to cookies.

In this paper, we will describe how we implemented RBAC with role hierarchy [FCK95, SCFY96] on the Web using the secure cookies. To provide security services to secure cookies, we used CGI scripts and the PGP (Pretty Good Privacy) package, which are already in widespread current use.

The rest of the paper is organized as follows. First, in Section 4.4.3., we describe the technologies most relevant to our work, such as RBAC, cookies, and PGP. In Section 4.4.4., we describe security threats to cookies, and how to design secure cookies to support RBAC on the Web. In Section 4.4.5., we describe how we actually implemented RBAC on the Web by secure cookies, using CGI scripts and PGP on an existing Web server. Section 4.4.6 gives our conclusions.

4.4.3. Related Technologies
4.4.3.1. Role-Based Access Control (RBAC)

Role-based access control (RBAC) [San98] has rapidly emerged in the 1990s as a promising technology for managing and enforcing security in large-scale enterprise-wide systems. The basic notion or RBAC is that permissions are associated with roles, and users are assigned to appropriate roles. This greatly simplifies security management.

A role is a semantic construct forming the basis of access control policy. With RBAC, system administrators can create roles, grant permissions to those roles, and then assign users to the roles on the basis of their specific job responsibilities and policy. Therefore, role-permission relationships can be predefined, which makes it simple to assign users to the predefined roles. Without RBAC, it is difficult to determine what permissions have been authorized for what users.

RBAC is a promising alternative to traditional discretionary and mandatory access controls, and ensures that only authorized users are given access to certain data or resources. It also supports three well-known security policies: data abstraction, least-privilege assignment, and separation of duties.

4.4.3.2. Cookies

At present, there are many browsers that support cookies, including Netscape, MS Internet Explorer, GNNWorks, NetCruiser and OmniWeb. Cookies have been used for many purposes on the Web, such as selecting display mode (e.g., frames or text only), shopping cart selections, and carrying names, passwords, account numbers, or some other bits of identifying data on the user's machine. Although there are many ways to use cookies on the Web, the basic process and the contents of cookies are similar. The detailed cookie specifications are available in [KM97, KM98].

Whenever a browser sends an HTTP request for a URL to a Web server, only those cookies relevant to that server will be sent by the browser. If the server finds any cookies that are related to the server, those cookies are used during this communication between the browser and the server. However, if the server does not find any cookies specified for it, either that server does not use cookies in the communication or the server creates new cookies for subsequent communication between the browser and the server.

Web servers may update the contents of their cookies for any specific circumstance. The cookie-issuer is not important for cookie validation. In other words, a server can create cookies for other servers in the domain. This is an important aspect of cookies that will be used in our implementations described in Section 4.4.5.

4.4.3.3. Pretty Good Privacy (PGP)

PGP (Pretty Good Privacy), a popular software package originally developed by Phil Zimmermann, is widely used by the Internet community to provide cryptographic routines for e-mail, file transfer, and file storage applications [Zim95]. A proposed Internet standard has been developed [CDFT98], specifying use of PGP. It uses existing cryptographic algorithms and protocols and runs on multiple platforms. It provides data encryption and digital signature functions for basic message protection services.

PGP is based on public-key cryptography. It defines its own public-key pair management system and public-key certificates. The PGP key management system is based on the relationship between key owners, rather than on a single infrastructure such as X.509. Basically, it uses RSA for the convenience of the public-key cryptosystem, message digests (MD5, IDEA) for the speed of process, and Diffie-Hellman for key exchange. The updated version supports more cryptographic algorithms.

Even though the original purpose of PGP is to protect casual e-mail between Internet users, we decided to use the PGP package. The package is already widely used and satisfies our requirements, in conjunction with Web servers via CGI scripts for our implementation to protect cookies. These cookies have role information of the user.

4.4.4. Secure Cookies
4.4.4.1. Security Threats to Cookies

We distinguish three types of threats to cookies: network security threats, end-system threats and cookie-harvesting threats. Cookies transmitted in clear text on the network are susceptible to snooping (for subsequent replay) and to modification by network threats. Network threats can be foiled by use of the Secure Sockets Layer (SSL) protocol [WS96] which is widely deployed in servers and browsers. In many cases due to export restrictions from USA only weak keys (40 bits) are supported, but SSL technology is intrinsically capable of very strong protection against network threats. However, SSL can only secure cookies while they are on the network. Once the cookie is in the browser's end system it resides on the hard disk or memory in clear text. Such cookies can be trivially altered and can be easily copied from one computer to another, with or without connivance of the user on whose machine the cookie was originally stored. We call this the end-system threat. The ability to alter cookies allows users to forge authorization formation in cookies and to impersonate other users. The ability to copy cookies makes such forgery and impersonation all the easier. Additionally, if an attacker collects cookies by impersonating a site that accepts cookies from the users (who believe that they are communicating with a legitimate Web server), later he can use those harvested cookies for all other sites that accept those cookies. We call this the cookie-harvesting threat. These attacks are relatively easy to carry out and certainly do not require great hacker expertise.

4.4.4.2. Designing Secure Cookies for RBAC on the Web

In this subsection, we describe how to transform regular cookies—which have zero security—into secure cookies, which provide the classic security services against the three types of threats to cookies (described in the previous subsection).

Secure cookies provide three types of security services: authentication, integrity, and confidentiality services. Selection of the kinds and contents of secure cookies depends on applications and a given situation. However, at least one authentication cookie and the Seal_Cookie—which provides the integrity service to the cookies—must be used with other cookies to frame basic security services, regardless of applications.

FIG. 9 shows a set of secure cookies that we will create and use for RBAC on the Web. The Name_Cookie contains the user's name (e.g., Alice), and the Role_Cookie holds the user's role information (e.g., Director). The Life_Cookie is used to hold the lifetime of the sercure-cookie set in its Cookie_Value field and enables the Web server to check the integrity of the lifetime of the secure-cookie set. To protect these cookies from possible attacks, we will use IP_Cookie, Pswd_Cookis, and Seal_Cookie. Authentication cookies (i.e., IP_Cookie and Pswd_Cookie) verify the owner of the cookies by comparing the authentication information in the cookies to those coming from the users. The IP_Cookie holds the IP number of the user's machine, and the Pswd_Cookie holds the user's encrypted passwords. This confidentiality service protects the values of the cookies from being revealed to unauthorized entity. In our implementation, we used the IP_Cookie and Pswd_Cookie together to show the feasibility, but only one of those authentication cookies can be used to provide the authentication service. The choice of an authentication cookie depends on the situation. It is also possible for authentication to be based on use of RADIUS [RRSW97], Kerberos [SNS88, Neu94], and similar protocols. Our focus in this work is on techniques that make secure cookies self-sufficient rather than partly relying on other security protocols, which is always possible. Finally, the Seal_Cookie—which has the digital signature of the cookie-issuing server on the secure cookie-set—supports integrity service, protecting cookies against the threat that the contents of the cookies might be changed by unauthorized modification.

There are basically two cryptographic technologies applicable for secure cookies: public-key-based and secret-key-based solutions. In our implementation, we use the public-key-based solution for security services provided by a PGP package via CGI scripts. In the next section, we will describe secure cookie creation, verification, and use of the role information in the Role_Cookie for RBAC with role hierarchies, in turn.

4.4.5. RBAC Implementation by Secure Cookies

Figure 10:
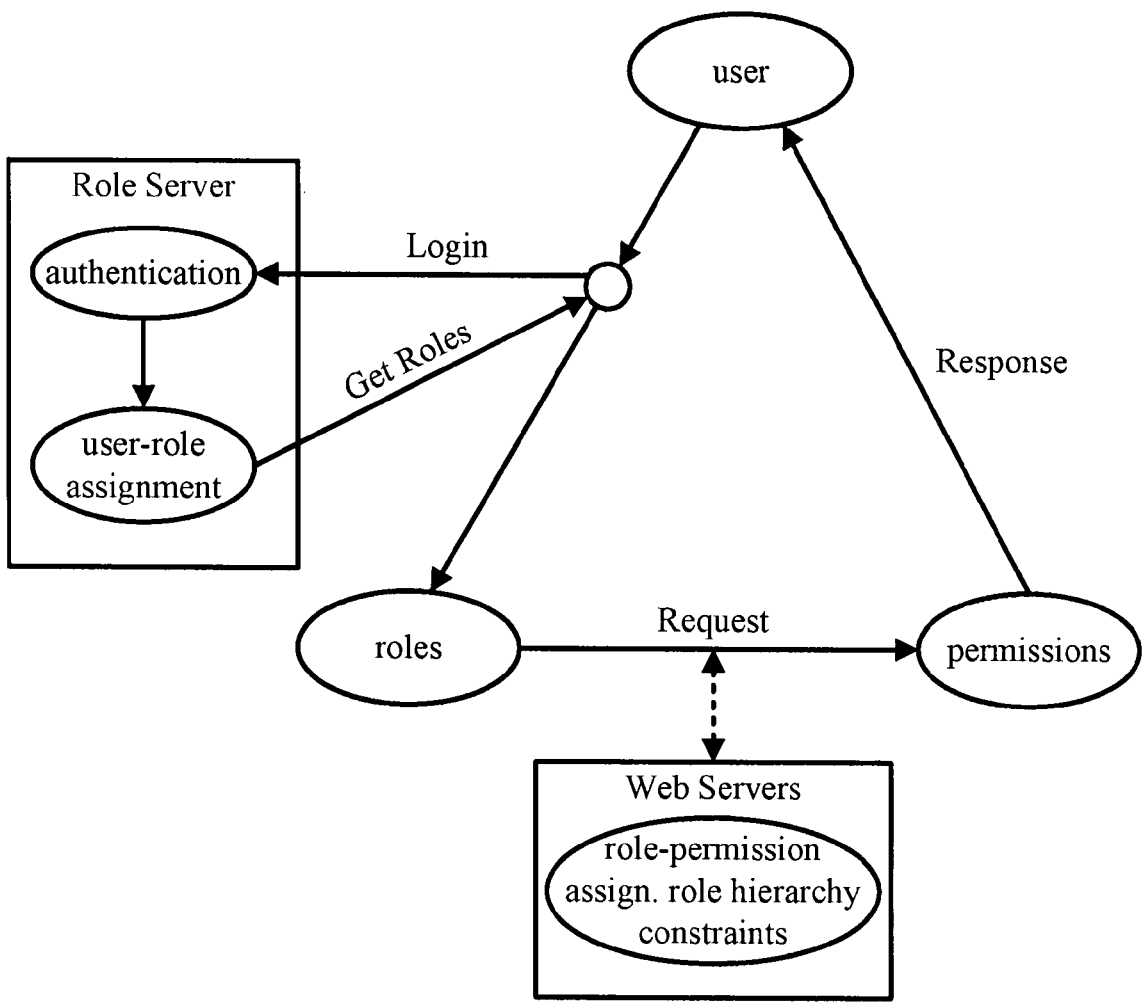
FIG. 10 is another example of a schematic of RBAC on the Web.

FIG. 10 shows a schematic of RBAC on the Web. The role server has user-role assignment information for the domain. After a successful user authentication, the user receives his or her assigned roles in the domain from the role server. Later, when the user requests access to a Web server with the assigned roles in the domain, the Web server allows the user to execute transactions based on the user's roles instead of identity. The Web servers may have role hierarchies or constraints based on their policies.

However, how can the Web servers trust the role information presented by users? For instance, a malicious user may have unauthorized access to the Web servers by using forged role information. Therefore, we must protect the role information from being forged by any possible attacks on the Web as well as in the end-systems.

Figure 11:
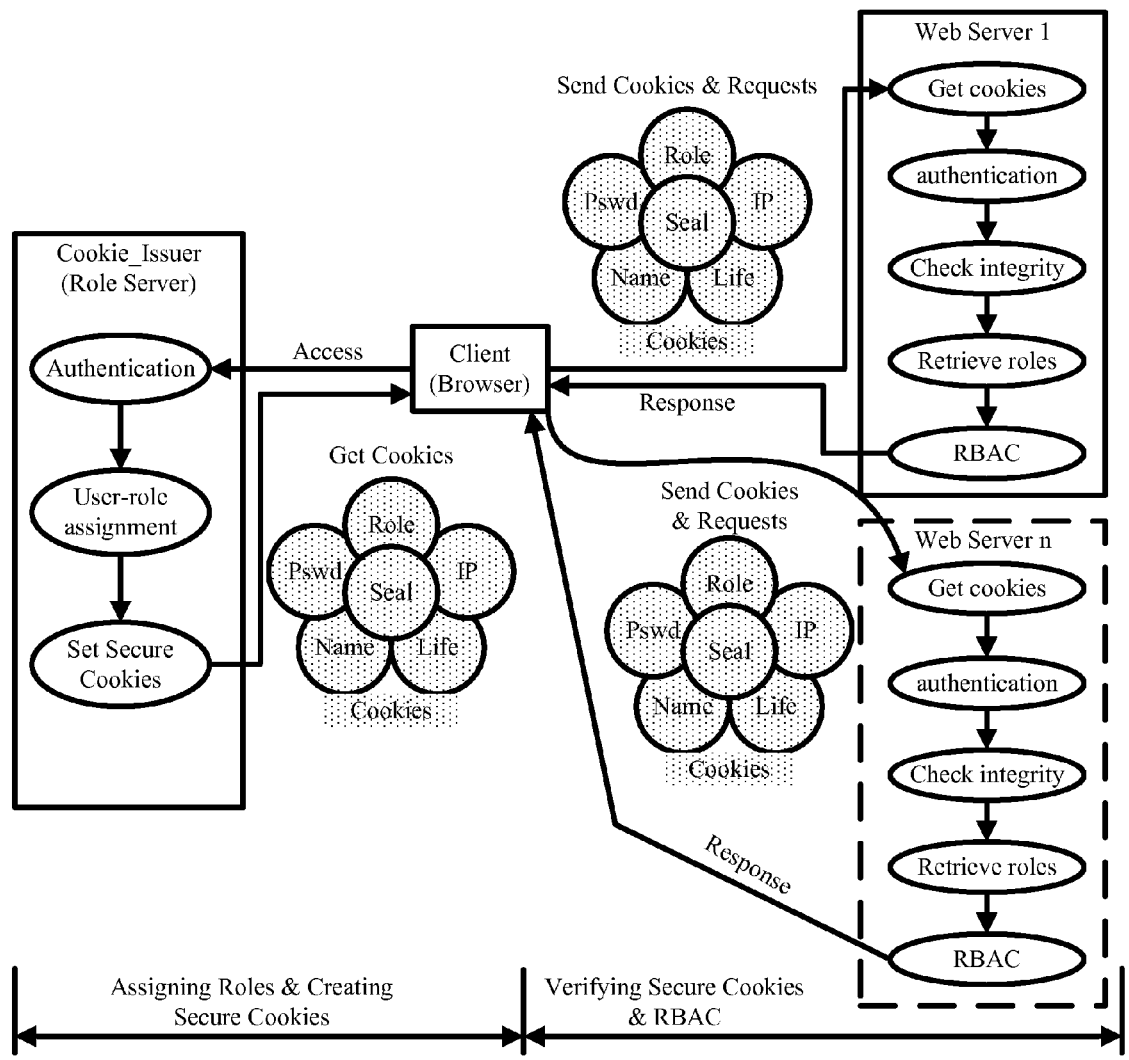
FIG. 11 is an illustration of RBAC on the Web by secure cookies.

There can be many possible ways to support the above requirement. In this paper, as one possible solution, we will describe how to protect the role information from possible threats using secure cookies, and how we implemented RBAC (Role-Based Access Control) with role hierarchy on the Web. FIG. 11 shows how the secure cookies (including a Role_Cookie) for RBAC are created and used on the Web. If a user, let's say Alice, wants to execute transactions in the Web servers in an RBAC-compliant domain, she first connects to the role server in the beginning of the session. After the role server authenticates Alice, it finds Alice's explicitly assigned roles in the URA (User-Role Assignment [SP98, SB97]) database and creates a set of secure cookies: Name_Cookie, Life_Cookie, Role_Cookies, IP_Cookie, Pswd_Cookie, and Seal_Cookie. Then, those secure cookies are sent to and stored in Alice's hard drive securely so that Alice does not need to go back to the role server to get her assigned roles until the cookies expire. Namely, she can use the roles in her Role_Cookie securely in the RBAC-compliant domain as long as the cookies are valid.

When Alice requests access to a Web server—which has PRA (Permission-Role Assignment [SBC+97]) information—by typing the server URL in her browser, the browser sends the corresponding set of secure cookies to the Web server: Name_Cookie, Life_Cookie, Role_Cookies, IP_Cookie, Pswd_Cookie, and Seal_Cookie. The Web server authenticates the owner of the cookies by using the IP_Cookie and Pswd_Cookie, comparing the value in the cookies with the values coming from the user. The user's passwords are encrypted in the Pswd_Cookie using the Web server's public key. The Web server decrypts the value of the Pswd_Cookie by using the corresponding key to read the user's passwords. Finally, the Web server checks the integrity of the cookies by verifying role server's digital signature in the Seal_Cookie using the role server's public key. If all the cookies are valid and verified successfully, the Web server trusts the role information in the Role_Cookie and uses it for RBAC with a role hierarchy and permission-role assignment information in the Web server.

4.4.5.1. Secure Cookie Creation

Figure 12:
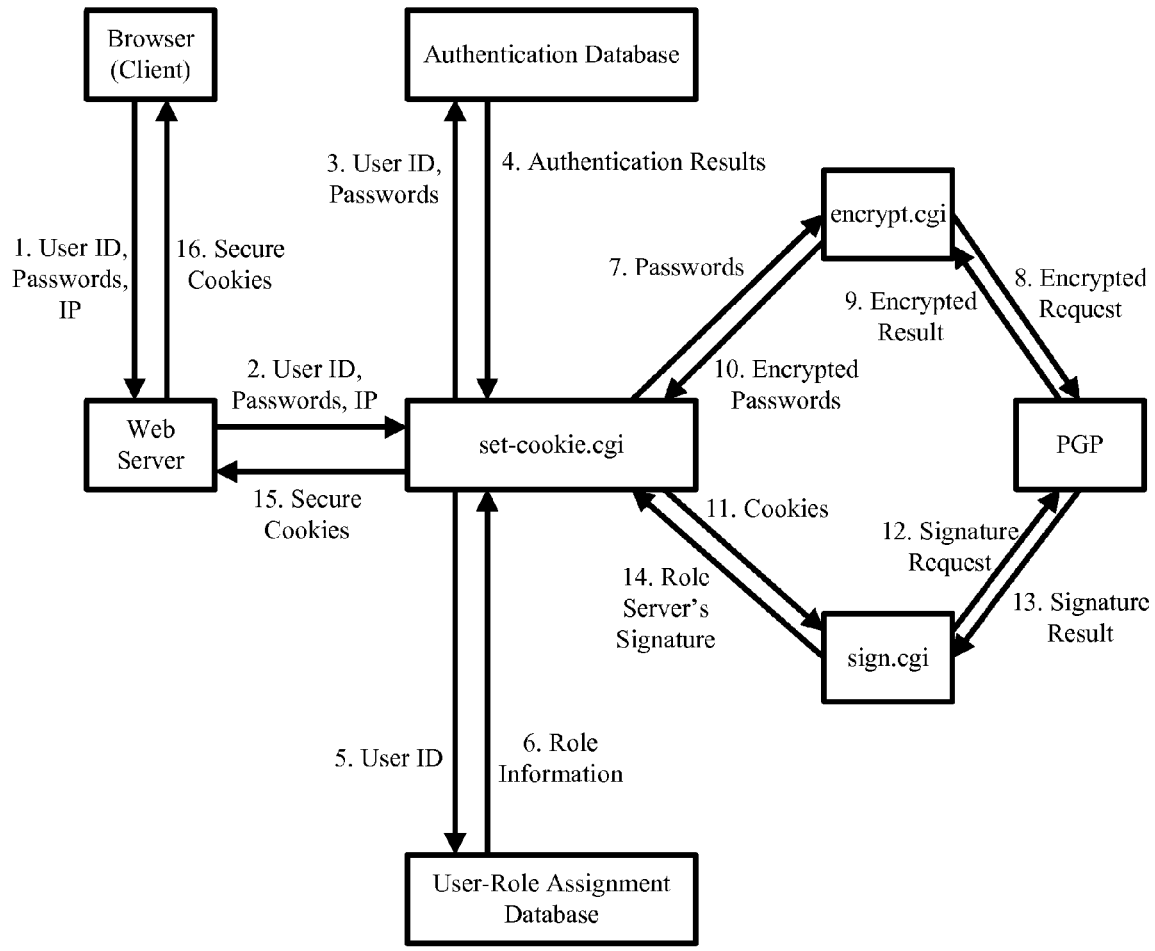
FIG. 12 shows an example of creating secure cookies.

When a user, Alice, connects to the role server (which supports HTTP) of the domain with her Web browser, she is prompted by the HTML form to type in her user ID and passwords for the domain. We used the POST method to send the information to the role server and the ACTION field to specify our Cookie-Set CGI program (set-cookie.cgi), to which the form data is passed. The GET request is very similar to the POST except that the values of the form variable are sent as part of the URL. However, the POST method sends the data after all their request headers have been sent to the server. FIG. 12 is a collaboration diagram in UML (Unified Modeling Language [BJR98]) style notation for secure cookie creation. This diagram shows how we create a set of secure cookies for our implementation (refer to the left side of FIG. 11).

The Web server receives the request headers, which include the address to the "set-cookie.cgi" program on the server. The server translates the headers into environment variables and executes the program. The "set-cookie.cgi" program first retrieves the user ID and passwords, and the IP number of the client machine form the environment variable, REMOTE_ADDR. The program authenticates the user by comparing the user ID and passwords with the ones in the authentication database. If the user already has an authenticfation cookie in a set of secure cookies, Web servers can use the authentication cookie for user authentication instead of authentication databases. It then assigns the user to roles by matching the user ID and the corresponding roles from the URA (User-Role Assignment) database.

Subsequently, a subroutine for encryption is called to another CGI program (encrypt.cgi), which uses PGP to encrypt the passwords by the cookie-verifying Web server's public key. These encrypted passwords will be stored in the Pswd_Cookie, by the "set-cookie.cgi" program. Then, the "set-cookie.cgi" program creates IP_Cookie, Pswd_Cookie, Name_Cookie, Life_cookie, and Role_Cookie, giving each cookie the corresponding value: IP number of the client machine, encrypted passwords, user's name, lifetime of the cookie set, and assigned roles.

To support the integrity service of the cookies, the "set-cookie.cgi" program calls another CGI program (sign.cgi), which uses PGP to sign on the message digest with the role server's private key. The "set-cookie.cgi" then creates the Seal_Cookie, which includes the digital signature of the role server on the message digest of the cookies.

Figure 13:
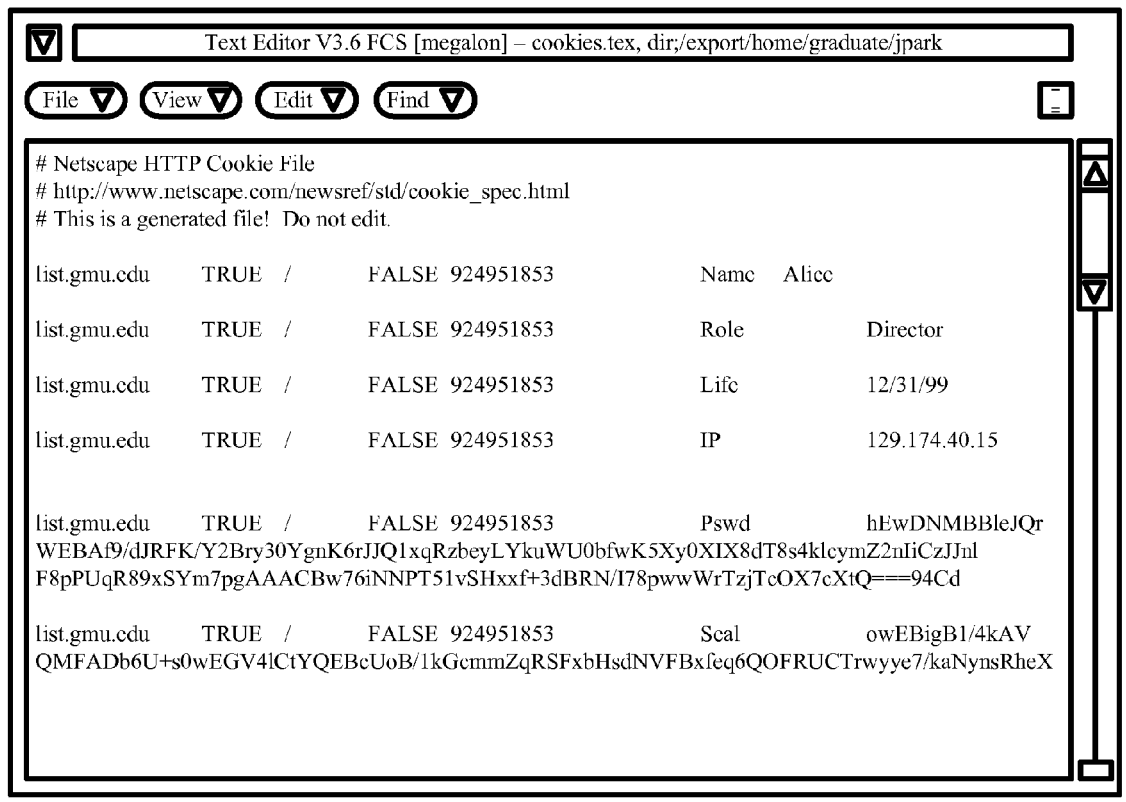
FIG. 13 is an example of secure cookies stored in a user's machine.

Finally, the Web server sends the HTTP response header, along with the cookies, back to the user's browser, and the cookies are stored in the browser until they expire. These secure cookies will be verified and used in the Web servers as described in the following subsections. FIG. 13 is an actual snapshot of a set of secure cookies from our implementation that are stored in the user's machine after the cookies are generated by the cookie-issuing Web server. The contents of the cookies exactly reflect the ones presented in FIG. 9. Each cookie has its corresponding domain, flag, path, security flag, expiration date, name, and value. The user's name, role, lifetime of the cookie set, IP number, encrypted passwords, and the digital signature of the cookie-issuing Web server on the cookies are stored in the corresponding cookies.

4.4.5.2. Secure Cookie Verification

Figure 14:
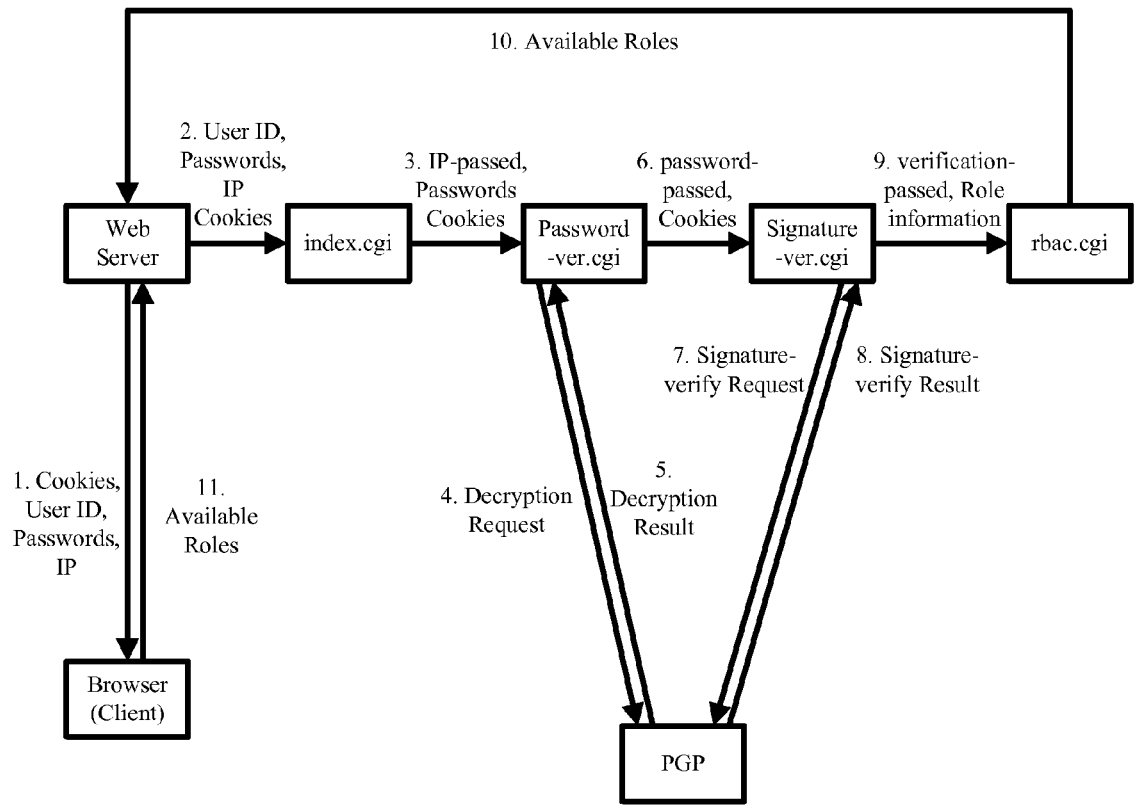
FIG. 14 illustrates a way of verifying secure cookies as per an aspect of an embodiment of the present invention.

FIG. 14 is a collaborational diagram in UML style notation for secure cookie verification. This diagram shows how we verify (corresponding to the right side of FIG. 11) the set of secure cookies that we generated in the previous subsection for our implementation. When Alice connects to a Web server (which accepts the secure cookies) in an RBAC-compliant domain, the connection is redirected to the "index.cgi" program. The related secure cookies are sent to the Web server and she is prompted by the HTML form to type in her user ID and passwords. The "index.cgi" program first uses the HTTP_COOKIE environment variable to retrieve the secure cookies (Name_Cookie, Life_Cookie, Role_Cookies, IP_Cookie, Pswd_Cookie, and Seal_Cookie) for the Web server. It then checks the validity of all the cookies. The two IP addresses, one from the IP cookie and the other from the environment variable, REMOTE_ADDR, are compared. If they are identical, then the host-based authentication is passed, and a hidden field "status" with the value of "IP-passed" is created to indicate that this stage was passed. We used a hidden field to check the completion of the previous stage, which is passed on to the next program. This hidden field protects the pages from being accessed directly, skipping required verification steps, by a malicious user. For example, without this hidden field, a malicious user can access the pages directly with forged cookies. However, if the IP numbers are different, the user is rejected by the server.

When the user submits her user ID and passwords to the server, the Web server translates the request headers into environment variables, and another CGI program, "password-ver.cgi," is executed. We used the POST method to send the information to the Web server and the ACTION field to specify the CGI program (password-ver.cgi_ to which the form data are passed. The first thing the "password-ver.cgi" does is to check the hidden field "status" to see if the previous stage was successfully completed. If this is "IP-passed," the program decrypts the value of the Pswd_Cookie (encrypted user password) using the PGP with the Web server's private key, since it was encrypted with the Web server's public key by the role server. The program (password-ver.cgi) then compares the two passwords: one from the user and the other decrypted from the Pswd_Cookie. If they are identical, then the user-based authentication is passed, and a hidden field "status" with the value of "password-passed" is created to indicate that this stage was passed. However, if the two passwords are different, the user has to start again by either retyping the passwords or receiving new cookies from the role server.

After the password verification is completed, another CGI program, "signature-ver.cgi," is activated to check the integrity of the cookies. Like the other programs, it first checks the value of "status" passed on from the previous program, and it proceeds only if it shows the user has been through the password verification stage. If the value is "password-passed," then the program verifies the signature in the Seal_Cookie with the role server's public key using PGP. If the integrity is verified, it means that the cookies have not been altered, and a hidden field "status" with the value of "verify-passed" is created to indicate that this role information in the Role_Cookie for role-based access control in the server as described in the following subsection. However, if the signature verification is failed, the user has to start again by receiving new cookies from the role server.

4.4.5.3. RBAC in the Web Server

Figure 15:
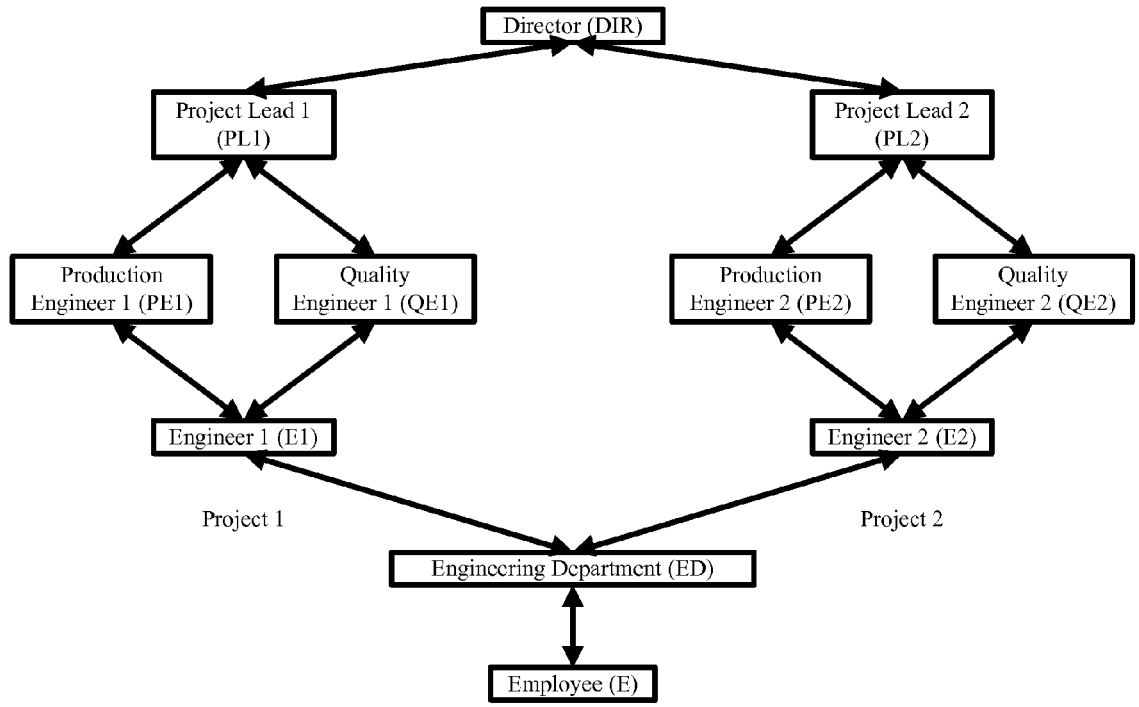
FIG. 15 is an example of role hierarchy.

After verifying all the secure cookies, the Web server allows the user, Alice, to execute transactions based on her roles, contained in the Role_Cookie, instead of her identity. In other words, the Web server does not care about the user's identity for authorization purposes. This resolves the scalability problem of the identity-based access control, which is being used mostly in existing Web servers. Furthermore, the Web server can also use a role hierarchy, which supports a natural means for structuring roles to reflect an organization's lines of authority and responsibility. Each Web server may have a role hierarchy different from that in other servers. In our implementation, we used a role hierarchy in the Web server, depicted in FIG. 15. The location of RBAC-compliant Web servers is geographically free from that of the role server, since cookies can be issued by one Web server for use by others, regardless of their physical location.

If the "rbac.cgi" program in FIG. 14 receives the value, "verify-passed," from the previous verification step, it means that the cookies have successfully passed all the verification stages, such as IP, passwords, and signature verification. Therefore, the Web server can trust the role information in the Role_Cookie, and uses it for role-based access control in the server.

Suppose Alice has the role DIR in her Role_cookie and she wants to access resources for PE1—which require the PE1 role or roles senior to the PE1 role in the role hierarchy—in a Web server. Multiple roles can be stored in a Role_Cookie.

First, she has to prove that the cookies she is presenting are genuine. To prove this, she has to go through all the verification steps: IP, passwords, and signature verification. She cannot jump ahead or skip any verification stage, as each program requires a hidden field, "status," from the previous stage. After the Web server has successfully completed all the verification steps, the "rbac.cgi" program retrieves the role information, DIR, from Alice's Role_Cookie, and shows all the available roles based on the role hierarchy depicted in FIG. 15. In this example, all the roles from E to DIR are available to Alice, since she has the senior most role in the role hierarchy. Since she wants access to the pages that require PE1's privilege, she chooses the PE1 role and the roles junior to PE1, such as E1, ED and E. now, when Alice requests access to a particular page in the server, the page checks if her activated role, PE1, has permission to access the page.

The user can use any roles among her available roles by activating them. For instance, if Alice would activate PL1, then she would be allowed to access the pages, which require the PE1 role, since PL1 is senior to PE1 in the role hierarchy. However, if she were to activate E1, then she would not be allowed to access the pages, since E1 is junior to PE1. This supports least privileges, since only those permissions required for the tasks are turned on by activated the required role.

How then can the Web server protect the pages from being accessed by unauthorized users? Suppose a malicious user, Bob, has the role PE1 but wishes to access pages that require the PL1 role. He could change the value of his Role_Cookie so that it has PL1, or roles senior to PL1. He would go through the password verification stages, since he would be able to log in as Bob by using his own passwords. However, when his Seal_Cookie is being verified, there would be a problem as the signature verification would fail. Therefore, he would not be allowed to move beyond this stage. On the other hand, he could try accessing the pages directly by typing the URLs. This would not be allowed, since each page checks to see if he has activated the required role, PL1, or roles senior to PL1. In other words, Bob is not allowed to access the pages, which require roles senior to his, because he cannot activate the senior roles, which are out of his available role range.

As a result, the Web server allows only users, who have gone through all the verification steps with the secure cookies (Name_Cookie, Life_Cookie, Role_Cookies, IP_Cookie, Pswd_Cookie, Seal_Cookie), to access the pages. This access also is possible only if the users have the required roles and activate them among their available roles based on the role hierarchy.

4.4.6. Conclusions

In this paper, we have described how we implemented RBAC with role hierarchies on the Web using secure cookies. To protect the role information in the cookies, we provided security services, such as authentication, confidentiality, and integrity, to the cookies using PGP and CGI scripts in the Web servers. The cookie-issuing Web server creates a set of secure cookies including the user's role information, and other Web servers use the role information for RBAC with role hierarchies after cookie verification. This access control mechanism solves the scalability problem of existing Web servers. The user of secure cookies is a transparent process to users and applicable to existing Web servers and browsers.

4.4.7. Acknowledgements

This work is partially supported by the National Security Agency under its IDEA program.

Without further elaboration, it is believed that one skilled in the art can using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention, and without departing from the spirit and scope thereof can make various changes and modifications of the invention to adapt it to various usages and conditions.

5. References

[BCK96] Mihir Bellare, Ran Canetti, and Hugo Krawczyk. Keying hashing functions for message authentication. In *Advances in Cryptography—CRYPTO '90 Proceedings*, volume 1109, Springer-Verlag, 1996. Lecture Notes in Computer Science.

[BJR98] Grady Booch, Ivar Jacobson, and James Rumbaugh. *The unified modeling language user guide*. Addison-Wesley, 1998.

[CDFT98] J. Callas, L. Donnerhacke, H. Finney, and R. Thayer. *OpenPGP massage Format*, November 1998. RFC 2440.

[DH97] Whitfield Diffie and Martin Hellman. ANSI X9.42: *Establishment of Symmetric Algorithm Keys Using Diffie-Hellman*, 1997. American National Standards Institute.

[FCK95] David Ferraiolo, Janet Cugini, and Richard Kuhn. Role-based access control (RBAC): Features and motivations. In *Proceedings of 11th Annual Computer Security Application Conference*, pages 241-48, New Orleans, La., Dec. 11-15 1995.

[Fed91] Federal Register. *Proposed Federal Information Processing Standard for Digital Signature Standard (DSS)*, August 1991. n.169.

[Fed95] Federal Information Processing Standard (FIPS). *Secure Hash Standard*, 1995. FIFS 180-1.

[Her96] Eric Herrmann. *CGI Programming with Perl 5*. Sams Net, 1996.

[KM97] David M. Kristol and Lou Montulli. *HTTP state management mechanism*, February 1997. RFC 2109.

[KM98] David M. Kristol and Lou Montulli. *HTTP state management mechanism*, February 1998. draft-ietf-http-state-man-mec-08.txt.

[Neu94] B. Clifford Neuman. Using Kerberos for authentication on computer networks. *IEEE Communications*, 32(9), 1994.

[Riv92] R. L. Rivest. *The MD5 message digest algorithm*, April 1992. RFC 1321.

[RRSW97] C. Rigney, A. Rubens, W. A. Simpson, and S. Willens. *Remote Authentication Dial in User Service RADIUS*, April 1997. RFC 2138.

[RS98] E. Rescorla and A. Schiffman. *Security Extensions For HTML*, June 1998. draft-ietf-wts-shtml-05.txt.

[RSA78] R. L. Rivest, A. Shamir, and L. Adleman. A method for obtaining digital signatures and public-key cryptosystems. *Communications of the ACM*, 21(2): 120-126, 1978.

[San98] Ravi Sandhu. Role-based access control. *Advances in Computers*, 46, 1998.

[SB97] Ravi Sandhu and Venkata Bhamidipati. The URA97 model for role-based administration of user-role assignment. In T. Y. Lin and Xiaolei Qian, editors, *Database Security XI: Status and Prospects*. North-Holland, 1997.

[SBC+97] Ravi Sandhu, Venkata Bhamidipati, Edward Coyne, Srinivas Ganta, and Charles Youman. The ARBAC97 model for role-based administration of roles: Preliminary description and outline. In *Proceedings of $2^{nd}$ ACM Workshop on Role-Based Access Control*, pages 41-50. ACM, Fairfax, Va., Nov. 6-7, 1997.

[SCFY96] Ravi S. Sandhu, Edward J. Coyne, Hal L. Feinstein, and Charles E. Youman. Role-based access control models. *IEEE Computer*, 29(2):38-47, February 1996.

[SNS88] J. F. Steiner, C. Neuman, and J. I. Schiller. Kerberos: An authentication service for open network systems. In *Proc. Winter USENIX Conference*, 1988.

[SP98] Ravi Sandhu and Joon S. Park. Decentralized user-role assignment for Web-based intranets. In *Proceedings of 3rd ACM Workshop on Role-Based Access Control*, pages 1-12. ACM, Fairfax, Va., Oct. 22-23, 1998.

[SR98] A. Schiffman and E. Rescorla. *The Secure Hyper-Text Transfer Protocol*, June 1998. draft-ietf-wts-shttp-06.txt.

[WS96] D. Wagner and B. Schneier. Analysis of the SSL 3.0 protocol. In *Proceedings of the Second UNIX Workshop on Electronic Commerce*, November 1996.

[Zim95] Phillip R. Zimmermann. *The Official PGP User's Guide*. MIT Press, 1995.

What is claimed is:

1. A key cookie, said key cookie being a secure cookie comprising:
   a) a domain field capable of holding domain data to associate said key cookie to a domain where said key cookie is valid;
   b) at least one name field capable of holding name data;
   c) at least one value field capable of holding value data derived from conforming client data;
   d) an expiration field capable of holding cookie expiration data; and
   e) an encrypted session key, said encrypted session key capable of being used for encrypting said value data contained in another of said at least two secure cookie; and
   wherein:
      1. said key cookie is created for use in transferring secure data between a client and a server;
      2. said client capable of presenting said conforming client data;
      3. said server capable of using said conforming client data to create at least two of said secure cookie;
      4. at least one of said at least two secure cookie capable of being transported between said server and said client over a network;
      5. at least one of said at least two secure cookie capable of being stored in a client storage; and
      6. said client capable of being authenticated by a secure attribute service between said client and said server, said secure attribute service capable of comparing said conforming client data with said value data when authenticating said client.

2. A key cookie according to claim 1, wherein at least some of said conforming client data is retrieved from a client.

3. A key cookie according to claim 1, wherein said conforming client data includes the client's IP address.

4. A key cookie according to claim 1, wherein said conforming client data includes a password.

5. A key cookie according to claim 1, wherein said conforming client data includes a Kerberos ticket.

6. A key cookie according to claim 1, wherein said conforming client data includes a digital signature.

7. A key cookie according to claim 6, wherein said digital signature is verified that said digital signature belongs to a client.

8. A key cookie according to claim 1, wherein said conforming client data includes data derived from at least one of the following:
   a) the Client's IP address;
   b) a password;
   c) a Kerberos ticket;
   d) credit card data;
   e) social security number;
   f) a digital signature of the client; and
   g) a home address.

9. A key cookie according to claim 1, wherein said key cookie further contains a digital signature of the client on a time-stamp.

10. A seal cookie, said seal cookie being a secure cookie comprising:
    a) a domain field capable of holding domain data to associate said seal cookie to a domain where said seal cookie is valid;
    b) at least one name field capable of holding name data;
    c) at least one value field capable of holding value data derived from conforming client data; and
    d) an expiration field capable of holding cookie expiration data; and
    wherein:
       1. said seal cookie is created for use in transferring secure data between a client and a server;
       2. said client capable of presenting said conforming client data;
       3. said server capable of using said conforming client data to create at least two of said secure cookie;
       4. at least one of said at least two secure cookie capable of being transported between said server and said client over a network;
       5. at least one of said at least two secure cookie capable of being stored in a client storage;
       6. said client capable of being authenticated by a secure attribute service between said client and said server, said secure attribute service capable of comparing said conforming client data with said value data when authenticating said client; and
       7. said seal cookie capable of being used by said server to determine if at least one of another of said at least two secure cookie has been altered.

11. A seal cookie according to claim 10, wherein at least some of said conforming client data is retrieved from a client.

12. A seal cookie according to claim 10, wherein said conforming client data includes the client's IP address.

13. A seal cookie according to claim 10, wherein said conforming client data includes a password.

14. A seal cookie according to claim 10, wherein said conforming client data includes a Kerberos ticket.

15. A seal cookie according to claim 10, wherein said conforming client data includes a digital signature.

16. A seal cookie according to claim 15, wherein said digital signature is verified that said digital signature belongs to a client.

17. A seal cookie according to claim 10, wherein said conforming client data includes data derived from at least one of the following:
    a) the Client's IP address;
    b) a password;
    c) a Kerberos ticket;
    d) credit card data;
    e) social security number;
    f) a digital signature of the client; and
    g) a home address.

18. A seal cookie according to claim 10, wherein said key cookie further contains a digital signature of the client on a time-stamp.

* * * * *